US012639131B1

(12) United States Patent
Virtuoso et al.

(10) Patent No.: US 12,639,131 B1
(45) Date of Patent: May 26, 2026

(54) VIRTUAL MACHINE HOST HEALTH MONITORING WITH UNTRUSTED SOURCES IN A CLOUD PROVIDER NETWORK

(71) Applicant: Amazon Technologies, Inc., Seattle, WA (US)

(72) Inventors: Anthony A. Virtuoso, Hawthorne, NJ (US); Eric Mills, Jersey City, NJ (US); Mehul Y. Shah, Redmond, WA (US); Mehul A. Shah, Saratoga, CA (US); Santosh Chandrachood, Saratoga, CA (US); Linchi Zhang, Sunnyvale, CA (US); Maheedhar Reddy Chappidi, San Jose, CA (US); Rahul Pathak, Mercer Island, WA (US); Bijay Singh Bisht, Foster City, CA (US); Md Zahidur Rahman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1202 days.

(21) Appl. No.: 17/547,715

(22) Filed: Dec. 10, 2021

(51) Int. Cl.
*G06F 9/50* (2006.01)
*G06F 21/54* (2013.01)
*G06F 21/55* (2013.01)

(52) U.S. Cl.
CPC .......... *G06F 9/5077* (2013.01); *G06F 9/5038* (2013.01); *G06F 9/505* (2013.01); *G06F 21/54* (2013.01); *G06F 21/554* (2013.01)

(58) Field of Classification Search
CPC ...... G06F 9/5077; G06F 9/5038; G06F 9/505; G06F 21/54; G06F 21/554
See application file for complete search history.

(56) References Cited

U.S. PATENT DOCUMENTS 8,881,142 B1 * 11/2014 Reid ...................... G06F 9/485
718/1
8,959,633 B1 * 2/2015 Dokey ................ H04L 63/1408
709/224

(Continued)

FOREIGN PATENT DOCUMENTS

AU 2014209471 A1 * 8/2015 ........... G06F 21/606
CA 3050651 A1 * 2/2020 ............. A61B 5/117

(Continued)

*Primary Examiner* — James R Sheleheda
(74) *Attorney, Agent, or Firm* — Nicholson De Vos Webster & Elliott LLP

(57) ABSTRACT

Techniques for monitoring virtual machine host system health with untrusted sources are described. An agent receives a request to terminate a first virtual machine, the request including an untrusted status indicator originating from an environment executing untrusted software. The agent sends first termination event data to a differential health service of the provider network, the first termination event data including an indication of a host computer system and the untrusted status indicator. The differential health service determines that a first metric associated with the first host computer system differs from a second metric associated with a pool of host computer systems by at least a first amount and based at least in part on the untrusted status indicator, wherein the pool of host computer systems includes the first host computer system. The differential health service sends a second request to cause a corrective action to be taken.

20 Claims, 9 Drawing Sheets

(56) References Cited

U.S. PATENT DOCUMENTS

| | | | | |
|---|---|---|---|---|
| 9,450,700 | B1* | 9/2016 | Van Tonder | H04L 41/046 |
| 9,477,570 | B2* | 10/2016 | DeHaan | G06F 11/3055 |
| 9,491,035 | B1* | 11/2016 | Pauley | H04L 41/5006 |
| 9,524,389 | B1* | 12/2016 | Roth | G06F 9/45558 |
| 9,921,860 | B1* | 3/2018 | Banga | G06F 9/5077 |
| 10,042,676 | B1* | 8/2018 | Wei | G06F 9/5077 |
| 10,313,225 | B1* | 6/2019 | Shevade | H04L 41/0806 |
| 10,452,420 | B1* | 10/2019 | Koryakin | G06F 9/45558 |
| 11,036,537 | B1* | 6/2021 | Quinn | G06F 9/45558 |
| 11,055,273 | B1* | 7/2021 | Meduri | G06F 16/2358 |
| 11,153,303 | B2* | 10/2021 | Scruby | H04L 9/3234 |
| 11,500,663 | B1* | 11/2022 | Gupta | G06F 8/63 |
| 11,507,408 | B1* | 11/2022 | Gabrielson | H04L 9/3247 |
| 11,656,912 | B1* | 5/2023 | Burgin | G06F 9/5022 |
| | | | | 718/105 |
| 11,750,475 | B1* | 9/2023 | Gonzalez | H04L 41/5032 |
| 12,067,119 | B1* | 8/2024 | Brandwine | G06F 9/45558 |
| 12,197,397 | B1* | 1/2025 | Greenwood | G06F 9/45541 |
| 12,248,818 | B1* | 3/2025 | Mao | G06F 21/45 |
| 12,277,449 | B1* | 4/2025 | Pathak | G06F 9/5038 |
| 2007/0118350 | A1* | 5/2007 | van der Made | G06F 21/566 |
| | | | | 703/22 |
| 2007/0234356 | A1* | 10/2007 | Martins | G06F 8/63 |
| | | | | 718/1 |
| 2007/0240157 | A1* | 10/2007 | Herenyi | G06F 9/45504 |
| | | | | 718/1 |
| 2011/0099548 | A1* | 4/2011 | Shen | G06F 9/45558 |
| | | | | 718/1 |
| 2011/0239291 | A1* | 9/2011 | Sotka | H04L 63/1408 |
| | | | | 726/14 |
| 2012/0075314 | A1* | 3/2012 | Malakapalli | G06T 1/20 |
| | | | | 718/1 |
| 2013/0227552 | A1* | 8/2013 | Reddin | G06F 9/5016 |
| | | | | 718/1 |
| 2013/0311662 | A1* | 11/2013 | Stolyar | G06F 9/5027 |
| | | | | 709/226 |
| 2014/0068608 | A1* | 3/2014 | Kulkarni | G06F 9/5083 |
| | | | | 718/1 |
| 2014/0129698 | A1* | 5/2014 | Seago | G06F 9/542 |
| | | | | 709/224 |
| 2014/0137112 | A1* | 5/2014 | Rigolet | G06F 9/45558 |
| | | | | 718/1 |
| 2014/0137178 | A1* | 5/2014 | Thom | G06F 21/6218 |
| | | | | 726/17 |
| 2014/0281560 | A1* | 9/2014 | Ignatchenko | H04L 9/0897 |
| | | | | 713/181 |
| 2015/0039891 | A1* | 2/2015 | Ignatchenko | H04L 63/0853 |
| | | | | 718/1 |
| 2015/0052614 | A1* | 2/2015 | Crowell | G06F 21/53 |
| | | | | 726/25 |
| 2015/0127804 | A1* | 5/2015 | Kripalani | G06F 11/3485 |
| | | | | 709/224 |
| 2015/0161008 | A1* | 6/2015 | Antony | G06F 11/1415 |
| | | | | 714/16 |
| 2015/0309841 | A1* | 10/2015 | Ono | G06F 9/5027 |
| | | | | 718/1 |
| 2016/0117498 | A1* | 4/2016 | Saxena | G06F 21/445 |
| | | | | 726/26 |
| 2016/0335110 | A1* | 11/2016 | Paithane | H04L 63/145 |
| 2016/0378534 | A1* | 12/2016 | Oh | G06F 9/452 |
| | | | | 718/1 |
| 2017/0161117 | A1* | 6/2017 | Fukuda | G06F 9/5083 |
| 2017/0192809 | A1* | 7/2017 | Kaufer | G06F 9/45558 |
| 2017/0262300 | A1* | 9/2017 | Brandwine | H04L 43/20 |
| 2017/0310692 | A1* | 10/2017 | Ackerman | H04L 63/1425 |
| 2017/0359306 | A1* | 12/2017 | Thomas | G06F 21/52 |
| 2017/0364422 | A1* | 12/2017 | Antony | G06F 11/079 |
| 2018/0004539 | A1* | 1/2018 | Liguori | G06F 12/1009 |
| 2018/0129963 | A1* | 5/2018 | Razin | G06N 5/022 |
| 2018/0307508 | A1* | 10/2018 | Banerjee | G06F 9/452 |
| 2019/0265996 | A1* | 8/2019 | Shevade | G06F 9/45558 |
| 2020/0167248 | A1* | 5/2020 | Varshney | H04L 41/40 |
| 2020/0225972 | A1* | 7/2020 | Karunaratne | G06F 9/45558 |
| 2020/0244556 | A1* | 7/2020 | Shevade | H04L 41/0654 |
| 2020/0319801 | A1* | 10/2020 | Shemer | G06F 3/067 |
| 2020/0379818 | A1* | 12/2020 | Kiraly | G06F 9/5072 |
| 2021/0279107 | A1* | 9/2021 | Qu | G06F 9/45558 |
| 2022/0200997 | A1* | 6/2022 | Chan | G06F 9/5077 |
| 2022/0360560 | A1* | 11/2022 | Velugu | G06N 20/00 |
| 2023/0130553 | A1* | 4/2023 | Radev | G06F 16/185 |
| | | | | 714/4.11 |
| 2024/0111603 | A1* | 4/2024 | Krasilnikov | G06F 9/45558 |
| 2024/0362142 | A1* | 10/2024 | Berg | H04L 47/803 |
| 2024/0390801 | A1* | 11/2024 | Ignatchenko | A63F 13/69 |
| 2025/0047710 | A1* | 2/2025 | Gaikwad | H04L 63/20 |
| 2025/0077251 | A1* | 3/2025 | Tsirkin | G06F 9/45558 |
| 2025/0103966 | A1* | 3/2025 | Beauchesne | G06N 20/00 |
| 2025/0265074 | A1* | 8/2025 | Seletskiy | G06F 8/65 |
| 2025/0306888 | A1* | 10/2025 | Greenberg | G06F 8/65 |

FOREIGN PATENT DOCUMENTS

| | | | | |
|---|---|---|---|---|
| CN | 117194284 A | * | 12/2023 | |
| EP | 3948537 B1 | * | 5/2024 | G06F 9/5077 |
| WO | WO-2020236338 A1 | * | 11/2020 | G06F 21/62 |

\* cited by examiner

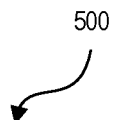

500

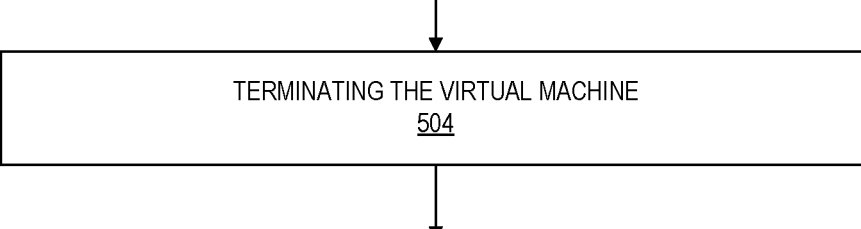

RECEIVING, BY AN AGENT THAT MANAGES ONE OR MORE VIRTUAL MACHINES EXECUTED BY A HOST COMPUTER SYSTEM OF A PROVIDER NETWORK, A REQUEST TO TERMINATE A FIRST VIRTUAL MACHINE, WHEREIN THE REQUEST INCLUDES AN UNTRUSTED STATUS INDICATOR ASSOCIATED WITH THE TERMINATION REQUEST, THE UNTRUSTED STATUS INDICATOR ORIGINATING FROM AN ENVIRONMENT EXECUTING UNTRUSTED SOFTWARE
502

TERMINATING THE VIRTUAL MACHINE
504

SENDING, BY THE AGENT, TERMINATION EVENT DATA TO A DIFFERENTIAL HEALTH SERVICE OF THE PROVIDER NETWORK, THE TERMINATION EVENT DATA INCLUDING AN INDICATION OF THE FIRST HOST COMPUTER SYSTEM AND THE UNTRUSTED STATUS INDICATOR ASSOCIATED WITH THE TERMINATION REQUEST
506

*FIG. 5*

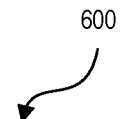

600

UPDATING A FIRST POPULATION OF TERMINATION EVENT DATA WITH THE FIRST TERMINATION EVENT DATA, WHEREIN EACH TERMINATION EVENT DATA IN THE FIRST POPULATION OF TERMINATION EVENT DATA REPRESENTS A VIRTUAL MACHINE TERMINATION EVENT AND INCLUDES AN UNTRUSTED STATUS INDICATOR ASSOCIATED WITH THE VIRTUAL MACHINE TERMINATION EVENT
602

DETERMINING THAT A FIRST METRIC ASSOCIATED WITH THE FIRST HOST COMPUTER SYSTEM DIFFERS FROM A SECOND METRIC ASSOCIATED WITH A POOL OF HOST COMPUTER SYSTEMS BY AT LEAST A FIRST AMOUNT AND BASED AT LEAST IN PART ON THE UNTRUSTED STATUS INDICATOR, WHEREIN THE POOL OF HOST COMPUTER SYSTEMS INCLUDES THE FIRST HOST COMPUTER SYSTEM
604

SENDING A REQUEST TO CAUSE A CORRECTIVE ACTION TO BE TAKEN ON THE FIRST HOST COMPUTER SYSTEM
606

VIRTUAL MACHINE HOST HEALTH MONITORING WITH UNTRUSTED SOURCES IN A CLOUD PROVIDER NETWORK

BACKGROUND

The advent of virtualization technologies has facilitated the rapid expansion of cloud provider networks. A cloud provider networks (or just "cloud") typically refers to a large pool of accessible virtualized computing resources (such as compute, storage, and networking resources, applications, and services).

BRIEF DESCRIPTION OF DRAWINGS

Various embodiments in accordance with the present disclosure will be described with reference to the following drawings.

FIG. 5 illustrates a method for terminating virtual machines according to some embodiments.

FIG. 6 illustrates a method for evaluating virtual machine host health based at least in part on untrusted virtual machine status data according to some embodiments.

DETAILED DESCRIPTION

Figure 1:
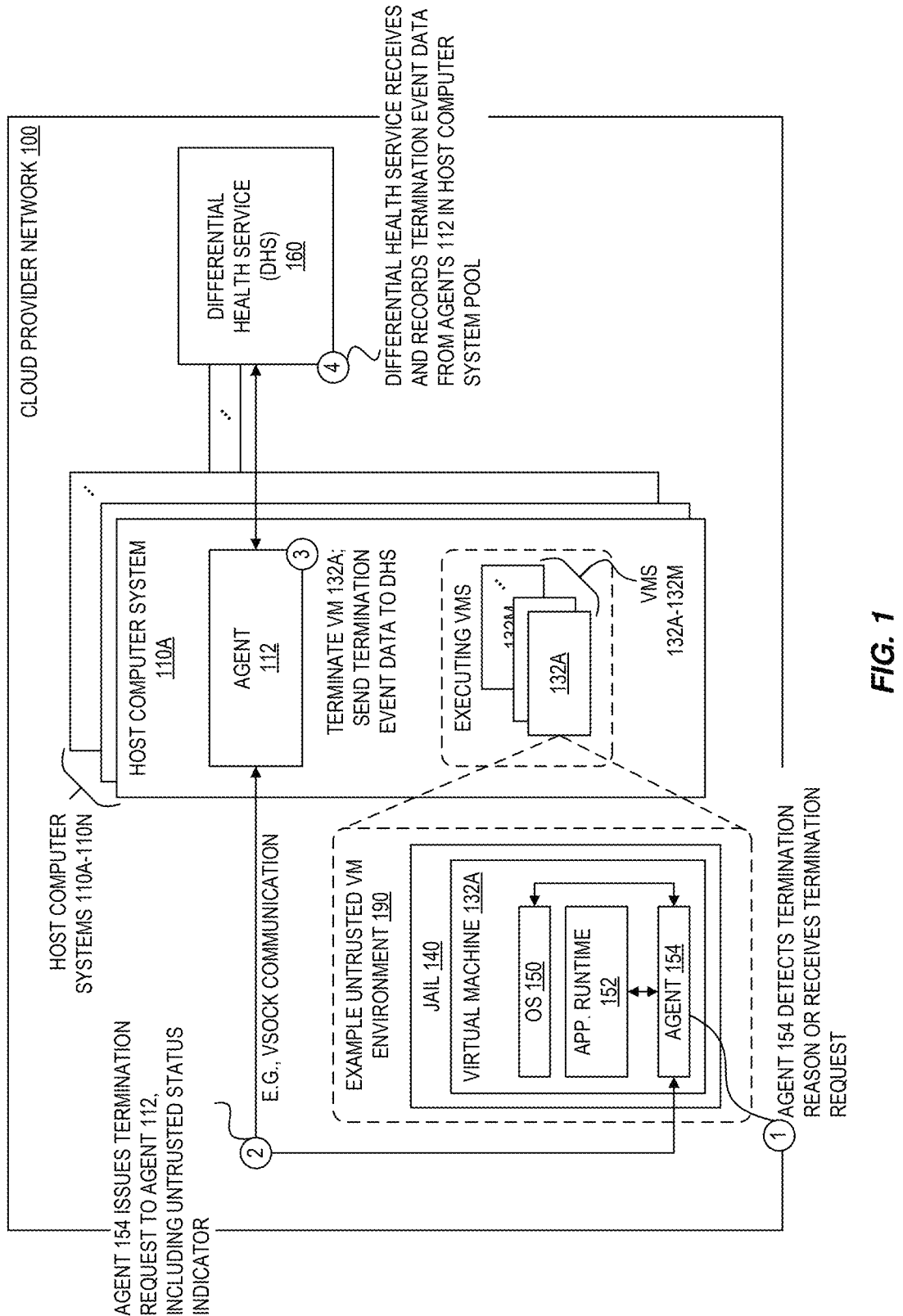
FIG. 1 is a diagram illustrating a cloud provider network environment including a differential health service that evaluates virtual machine host system health based on locally reported untrusted status data according to some embodiments.

The present disclosure relates to methods, apparatus, systems, and non-transitory computer-readable storage media for monitoring the health of computer systems that host virtual machines in a cloud provider network based at least in part on status data (sometimes referred to as health data) originating from untrusted sources.

Cloud provider networks offer large pools of computing resources to their customers through virtualization. Maintaining the health of underlying host computer systems that form these pools is a constant challenge. Traditional health monitoring approaches include installing health monitoring components on the host computer systems. Such components can run various tests and report results and/or failures to a health service of the provider network. Such reports are typically trusted as they originate from systems under the control of the provider network and/or protected from third-party interference. But these traditional trusted health monitoring approaches are not without disadvantages. For example, the execution of these health monitoring components imposes the overhead on the host computer systems that limits the amount of resource capacity available for virtualization. As another example, installing and executing these components can slow down the responsiveness of the computer systems by, for example, delaying the speed at which virtual machines can launch. As yet another example, errors or other unwanted behavior experienced by customers might be an indicator of anomalous system behavior that traditional health monitoring components might fail to detect.

Embodiments of the present disclosure relate to the acquisition, aggregation, and analysis of untrusted health data for use in making decisions regarding the health of host computer systems in a cloud provider network. Generally speaking, because customers have control of and/or can gain access to the software executed by their virtual machine environments, the cloud provider network treats data originating from within these virtual machine environments as untrusted. According to some embodiments, customer environments provide a status indicator (also referred to as a health indicator) reflective of their experience with the virtual machine when requesting the termination of the virtual machine. Because such status indicators originate from untrusted environments, there is a risk that a witting or unwitting customer might falsely report issues with their virtual machine(s). If the provider network were to act on these reports as if they were trusted, the provider network might inadvertently remove good host computer systems from the pools supporting virtualization thereby reducing system capacity and potentially negatively impacting other customers. To mitigate these risks, a differential health service of the cloud provider network evaluates an aggregation or population of indicators as part of making decisions regarding the health of the computer system that host virtual machines and determining whether to take corrective action on those computer systems determined to be unhealthy. The differential health service can identify host computer systems that are statistical outliers and initiate corrective actions to be taken on those systems. Exemplary corrective actions include removing an outlier system from the pool of systems being used to provide services and/or reducing the amount of time to the next maintenance cycle of an outlier system. Relying on untrusted status indicators has several benefits. Among others, it can reduce the amount of host system capacity set aside to traditional health monitoring components. It can also reduce the amount of code to be executed during the launch of a virtual machine thereby improving launch responsiveness. It can also surface errors or other anomalous behavior that might otherwise go undetected by traditional health monitoring approaches.

FIG. 1 is a diagram illustrating a cloud provider network environment including a differential health service that evaluates virtual machine host system health based on locally reported untrusted status data according to some embodiments. A cloud provider network 100 (or just "cloud" or "provider network") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. For example, the cloud provider network 100 provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, cloud provider networks often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

As illustrated, the cloud provider network 100 includes host computer systems 110A-110N. Each host computer system 110 includes an agent 112 that can provide the functionality of a hypervisor, VMM, or lightweight VMM such as described above. Such functionality includes the launching and termination of virtual machines on the associated host computer system 110. In this example, the host computer system 110A is executing virtual machines 132A-132M. These executing virtual machines are typically launched based on one or more launch parameters passed to the agent 112. Exemplary launch parameters include a hardware configuration parameter (e.g., to indicate the amount of processing and memory resources to allocate to the virtual machine), a software configuration parameter (e.g., to indicate whether any particular software programs are to be launched with the virtual machine), and a network configuration parameter (e.g., to indicate to which other network endpoints the virtual machine can connect/cam connect to the virtual machine).

The environment of virtual machine 132A is illustrated as example untrusted virtual machine environment 190 ("untrusted environment 190"). In this context, "untrusted" reflects the nature of the virtual machine being under the control of an entity that is not part of the service providing the virtual machine. Exemplary entities include internal or external customer of the cloud provider network, an employee or third-party customer of the cloud provider network customer, etc., and may be in the "user"-sense (e.g., a person) or "program"-sense (e.g., a software program).

In this example, the untrusted environment 190 includes an operating system 160 (sometimes referred to as a guest operating system), an application runtime 152, and an agent 154. In some embodiments, the virtual machine 132A is executed within a jail 140. A jail 140 is a construct within a host operating system that services to isolate a virtual machine and typically refers to one or more containment layers provided by the host operating system to limit (or prevent) access of processes executing within the jail from the broader host environment. Such jailing techniques may also be referred to as "sandboxing" the virtual machine environment.

Exemplary application runtimes 152 include software applications executed by the virtual machine (e.g., a web server, a data processing program, etc.) whether developed by the entity in control of the virtual machine 132 or another. The agent 154 provides a communication channel between the virtual machine 132A and the agent 112. One such communication channel is a virtual socket ("vsock") between the agent 154 and the agent 112. While the agent 154 may be developed by and or loaded into the virtual machine 132A the operator of the provider network, it is considered an "untrusted" entity because it is exposed within the untrusted environment 190.

During operation, the agent 154 can monitor the operating system 150 for errors, including unrecoverable or critical errors that affect the ability of the virtual machine 132A to continue operating. Additionally or alternatively, the agent 154 can vend an API to the application runtime 152 to allow the application runtime 152 to initiate the termination of the virtual machine 132A. The application runtime 152 may initiate the termination of the virtual machine 132A if, for example, it has successfully completed its task or it has encountered an error that prevents the successful completion of its task. The API may provide for the submission of a status indicator parameter to convey the performance of the virtual machine 132A as determined by the application runtime 152 (e.g., a good/bad flag, an error code, etc.). In either case and as indicated at circle 1, the agent 152 detects a reason to terminate the virtual machine 132A or receive a request to terminate the virtual machine 132A.

As indicated at circle 2, the agent 154 issues a termination request to the agent 112 via the communication channel between the two. The request includes an untrusted status indicator. Exemplary status indicators include a flag indicating a positive or negative experience (e.g., an OK/not OK or good/bad flag), an error code originating from either the operating system 150 or the application runtime 152, or an error code determined by the agent 154 based upon the event that initiated the termination request (as determined at circle 1).

As indicated at circle 3, the agent 112 terminates the virtual machine 132A. The agent 112 also sends data (or records and later sends such data) regarding that termination event to a differential health service 160. Exemplary termination event data includes the untrusted status indicator received from the untrusted environment and one or more other parameters. Exemplary one or more other parameters may expressly identify other data related to the termination event or implicitly permit such identification (e.g., an identifier that can be used to perform a database lookup). Such other data can include: the identity of the customer that launched/terminated the virtual machine, a hardware configuration of the virtual machine that indicates how much of and what resources of the underlying host computer system were allocated to the virtual machine, a software configuration of the virtual machine that indicates which software was loaded, an identifier of the virtual machine that was terminated, and a network configuration that indicates network information such as the network address(es) of the virtual machine, permitted inbound and outbound traffic, and/or restricted network traffic, etc. Termination event data can further include the identity of the host computer system from which the agent 112 sent the data, or the differential health service 160 can discern the identity of the host computer system based upon the source (e.g., the network address) of the message received from the agent 112.

As indicated at circle 4, the differential health service 160 receives termination event data from agents 112 operating across the pool of host computer systems 110A-110N and records those reported termination events. In some embodiments, the differential health service 160 is a customer of a database service (not shown) of the cloud provider network 100 and records termination events in a database provided by the database service. Additional details regarding the operation of the differential health service 160 are provided elsewhere herein, including in the description of FIGS. 4 and 6 below.

Figure 2:
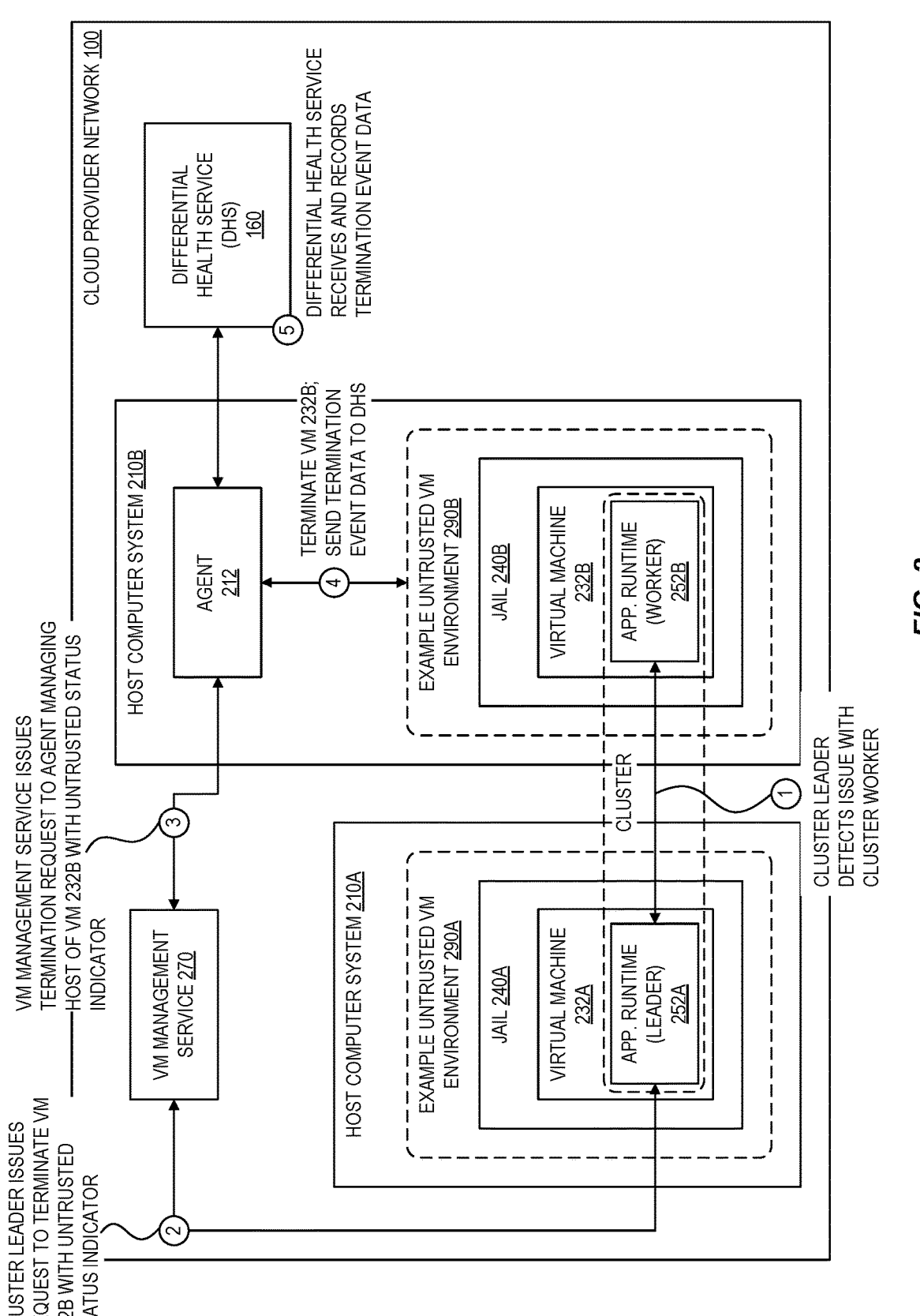
FIG. 2 is a diagram illustrating a cloud provider network environment including a differential health service that evaluates virtual machine host system health based on remotely reported untrusted status data according to some embodiments.

FIG. 2 is a diagram illustrating a cloud provider network environment including a differential health service that evaluates virtual machine host system health based on remotely reported untrusted status data according to some embodiments. By way of comparison to FIG. 1, the agent 154 of FIG. 1 might not detect problems that arise with the virtual machine 132A. For example, the virtual machine 132A might be a node in a computing cluster that is unreachable from another node. FIG. 2 illustrates another example in which untrusted status data can be reported by a remote entity that has a different view of the status of a virtual machine.

In this example, the cloud provider network 100 includes two host computer systems 210A and 210B respectively hosting two virtual machines 232A and 232B. As indicated, the virtual machines 232A and 232B form a cluster (e.g., across which to execute an application supporting distributed processing), and virtual machine 232A executes an application runtime 252A designated the "leader" of the cluster while virtual machine 232B executes an application runtime 232B that is a "worker" of the cluster.

As indicated at circle 1, the leader 252A may detect an issue with the operation of or communication with the worker 252B. As indicated at circle 2, the leader 252A issues a termination request to a virtual machine management service 270. The request includes an untrusted status indicator. Exemplary status indicators include a flag indicating a positive or negative experience or an error code originating from an application runtime 252. The request further includes an identifier of the virtual machine 232B (e.g., a global VM identifier, a network address of the virtual machine 232B). In other embodiments, the leader 252A may initiate the termination request by way of an agent (not shown) executing within the virtual machine 232A.

The virtual machine management service 270 interfaces with the agents of the host computer systems to perform operations such as launching and terminating virtual machines (e.g., with agents 112, 212). Upon receiving the request indicated at circle 2, the virtual machine management service 270 identifies an agent 212 of the host computer system 210B that hosts the virtual machine identified in the termination request (e.g., via a database lookup). In some embodiments, the request indicated at circle 2 may further include an authentication credential that the virtual management service 270 uses to authenticate that the termination request originated from a credentialed user with control over the virtual machine 232B. As indicated at circle 3, the virtual machine management service 270 issues termination request to the agent 212 to terminate the virtual machine 232B, the request including the untrusted status indicator.

As indicated at circle 4, the agent 212 terminates the virtual machine 232B. The agent 212 also sends data (or records and later sends such data) regarding that termination event to a differential health service 160. Exemplary termination event data is described above with reference to FIG. 1.

As indicated at circle 5, the differential health service 160 receives and records termination event data from the agents 212. Additional details regarding the operation of the differential health service 160 are provided elsewhere herein, including in the description of FIGS. 4 and 6 below.

The data flow of untrusted status indicators from entities initiating termination to the differential health service 160 shown in FIGS. 1 and 2 is exemplary in nature. Other embodiments may send untrusted status indicators to the differential health service 160 in different ways. For example, the untrusted entity initiating the termination event (e.g., the agent 154, the application runtime 252A) may separately issue a call to an API of a differential health service via which to submit termination event data including an untrusted status code.

Figure 3:
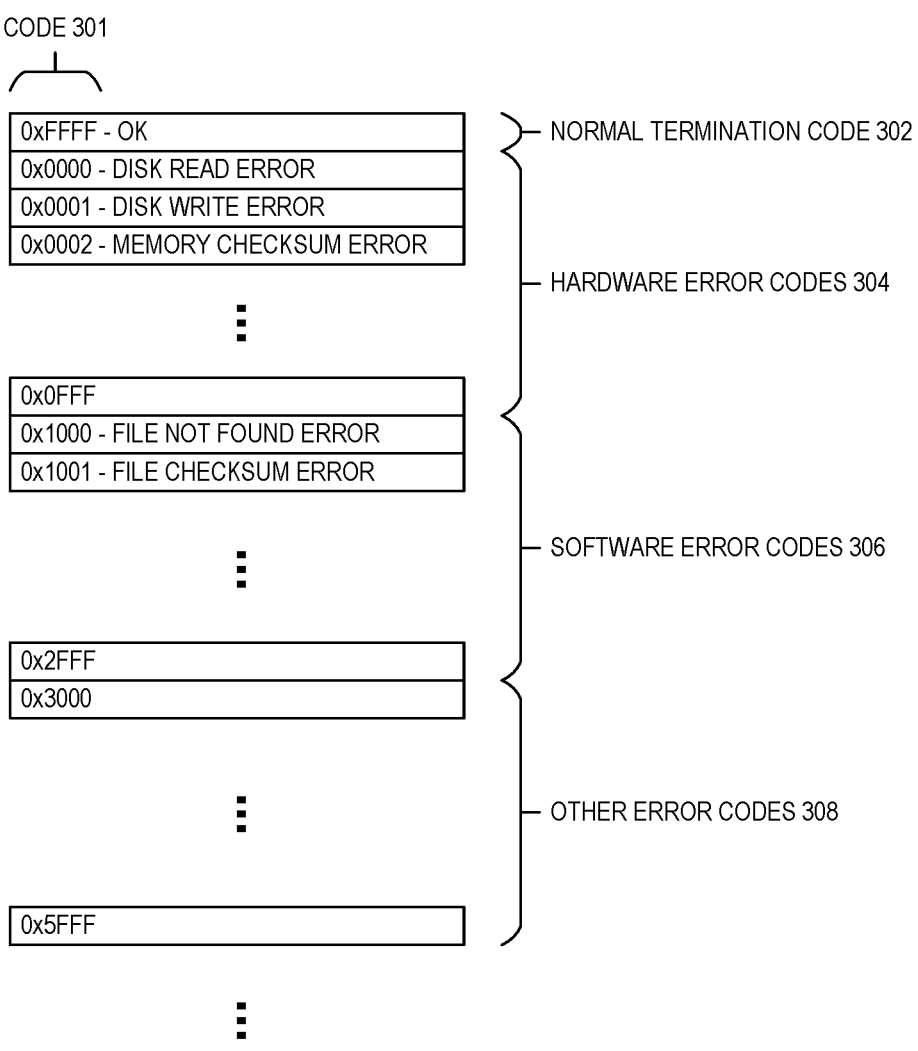
FIG. 3 is a diagram illustrating status data as error codes according to some embodiments.

FIG. 3 is a diagram illustrating status data as error codes according to some embodiments. The status (or health) indicators originating from untrusted environments can take on various forms. In some embodiments, the status indicator (also referred to as a "termination status indicator") may be a simple binary indication of whether the reason for termination was normal or abnormal (or good/bad, OK/not OK). In other embodiments, the status indicator may be a code 301 that corresponds to certain pre-defined causes for a termination request. In this example, the code 301 is a 16-bit value. The encoded reasons can include a normal termination code 302, various hardware error codes 304, various software error codes 306, and other error codes 308. By using a code 301, the untrusted initiator of a termination event can convey additional information regarding the basis for the termination to the differential health service.

The error codes can be preloaded or otherwise made available to the entity in the untrusted environment initiating the termination. For example, the error codes may be provided as part of a package or library that includes an interface (e.g., to an agent executing within the untrusted environment such as the agent 154 or to a service of the provider network such as the virtual machine management service 270) via which to initiate a termination. As another example, the error codes may be preloaded to an agent such as the agent 154.

Figure 4:
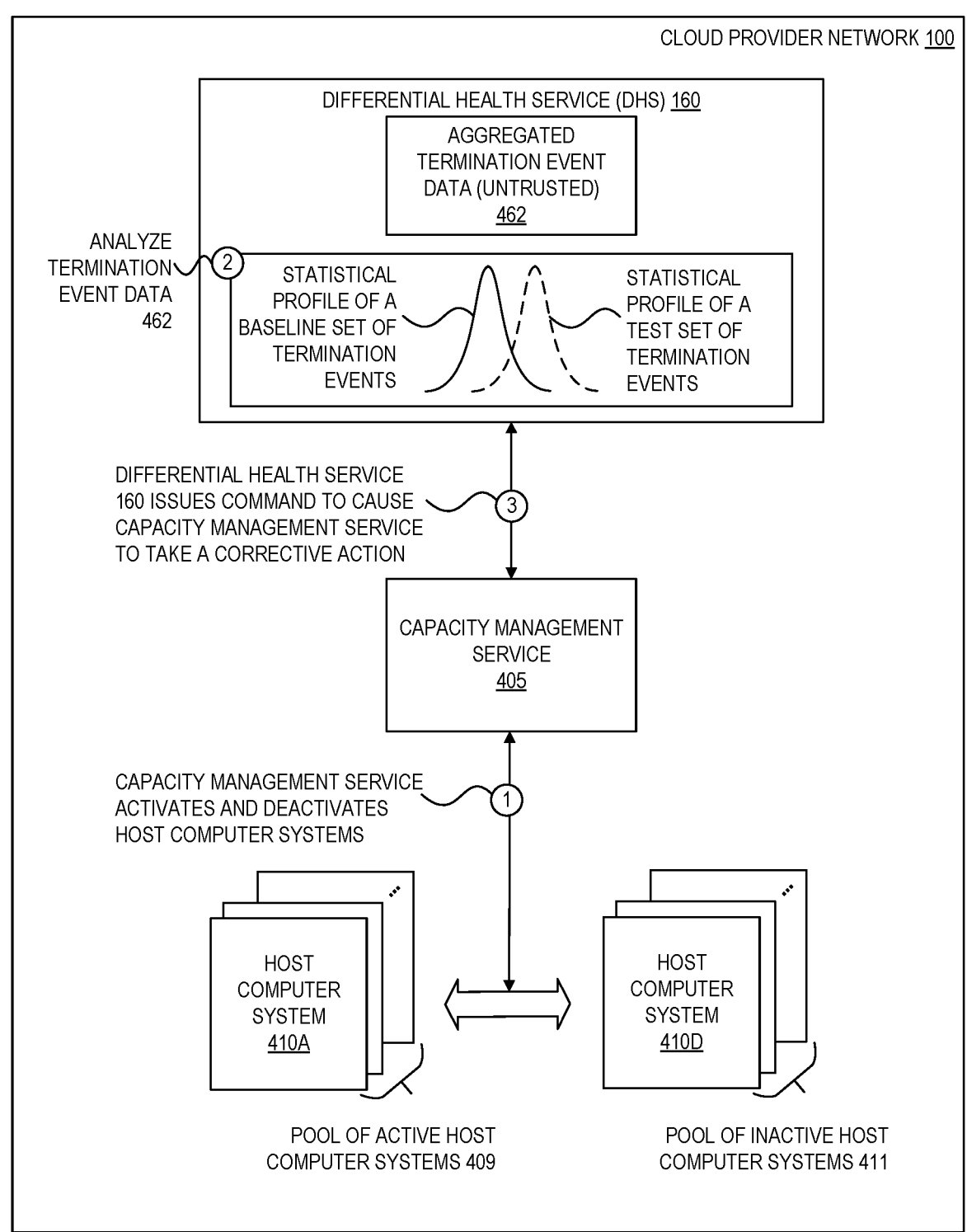
FIG. 4 is a diagram illustrating a capacity management service of a cloud provider network according to some embodiments.

FIG. 4 is a diagram illustrating a capacity management service of a cloud provider network according to some embodiments. At a high level, a capacity management service 405 of the cloud provider network 100 manages the fleet or pool of host computer systems providing resources to customers via virtualization. In this example, host computer systems are designated as being in one of two pools: a pool of active host computer systems 409 and a pool of inactive host computer systems 411. The pool of active host computer systems 409 includes computer systems such as host computer system 410A that are available for use in providing services (e.g., virtual machines) to customers. For example, a virtual machine management service (not shown) such as the virtual machine management service 270 may initiate launches of virtual machines on host computer systems in the pool 409. The pool of inactive host computer systems 411 includes computer systems such as host computer system 410D that are not available for use in providing services to customers. Exemplary reasons for these systems being inactive may be due to hardware failures, incremental software updates, or system re-builds (e.g., a system wipe followed by software updates). As indicated at circle 1, the capacity management service 405 can activate deactivated host computer systems (e.g., such as once a re-build is complete) or deactivate active host computer systems (e.g., in the case of a failure or scheduled re-build).

Because status indicators are originating from sources within untrusted environments (or simply "untrusted sources"), absolute reliance on those status indicators poses risks to the integrity of the cloud provider network such as those described above. To mitigate those risks, the differential health service 160 performs one or more analyses on termination event data 462 received from agents such as the agent 112 and/or the agent 212, as indicated at circle 2. As described above, exemplary termination event data 462 includes, for each termination event, an untrusted status indicator and other data related to the termination event. For example, the termination event data 462 for a single termination event may include the following data:

Host Identifier: 0xABCDEF
Customer Identifier: 0x123456
Hardware Configuration:
    vCPUS:2
    Memory: 2 GB
    DRIVE: N/A
Software Configuration:
    Host OS Version: 5.2.3
    Guest OS Version: 1.2
    [List of Application Runtimes and Versions]
Network Configuration:
    Virtual Machine IP Address:
Untrusted Status Indicator: 0

At a high level, the differential health service 160 compares one or more metrics derived from a baseline population against one or more metrics derived from a test population to identify potential sources of failure. An exemplary set of operations associated with such an analysis follows.

The differential health service 160 may select a population from the aggregated termination event data 462 to serve as a baseline population for metric comparison(s) with a test population. As an example of selecting a baseline population, if the aggregated termination event data 462 includes historical data, the differential health service 160 may first query the capacity management service 405 to get the time at which each of the computer systems in an active pool were most recently activated. The differential health service 160 may then remove termination events associated with a particular host computer system that precede the most recent activation time of that host computer system. As another example, the pool of active computer systems 409 may include sub-pools dedicated to serving certain services of the cloud provider network 100. One set of active computer systems might provide an analytics service, while another set of active computer systems might provide a data storage service. Because the failures across these two sub-pools may be distinct, the differential health service 160 may filter out termination events originating from systems outside of a pool of interest. As another example, the baseline population may be the entire population of termination event data that the differential health service 160 has aggregated.

In addition to selecting a baseline population, the differential health service 160 may select another population from the aggregated termination event data 462 to serve as a test population for metric comparison(s) with the baseline population. In selecting the test population, the differential health service 160 may select one or more parameters of interest in the termination event data 462. For example, to determine whether a particular host computer system was exhibiting a high degree of failures, the differential health service 160 could select the test population based on failure events in the baseline population originating from the particular host computer system.

The differential health service 160 can calculate one or more metrics from the baseline and test populations of termination event data. Exemplary metrics include means, standard deviations, counts of status indicators of different types (e.g., good and bad) or categories (e.g., errors and non-errors), percentiles, and so on. The differential health service can perform various comparisons on the calculated metrics to determine whether to initiate a corrective action. Some examples follow.

In some embodiments, the differential health service 160 performs a comparison based upon calculated failure rates of the baseline and test populations. For example, if the untrusted status indicator has a binary form (e.g., good/bad), the differential health service 160 can calculate the mean failure rate of the baseline population by dividing the total number of negative reports by the total number of reports. If failures are modeled as a binomial distribution, the variance (and thus the standard deviation) can be calculated from this mean failure rate. In a simplified example, if there are ten termination events and one with a negative status indicator, the mean failure rate would be 0.1 with a standard deviation of the square root of $10 \times 0.1 \times 0.9$ (e.g., where the standard deviation is the square root of the variance of an assumed binomial distribution). The differential health service 160 can then calculate the mean failure rate of the test population. If the mean failure rate of the test population exceeds the mean failure rate of the baseline population by some amount, the differential health service 160 can initiate a corrective action. For example, the differential health service 160 can initiate corrective action if the mean failure rate of the test population exceeds the mean failure rate of the baseline population by a threshold number of standard deviations.

In some embodiments, the differential health service 160 performs a comparison based upon the calculated failure rate of the test population against a calculated percentile of the baseline population. Although a mean plus or minus some number of standard deviations can be used to calculate a percentile of a population, other techniques for calculating the percentile are possible. For example, the differential health service 160 might calculate the mean failure rate for a plurality of baseline populations, each of those populations corresponding to the failure rate of a given host computer system. Upon sorting those failure rates, the differential health service 160 can determine a failure rate that represents a percentile (e.g., if there are 1,000 failure rates sorted from low to high, the failure rate at position 950 would correspond to the $95^{th}$ percentile). The differential health service 160 can then calculate the mean failure rate of the test population. If the mean failure rate of the test population meets or exceeds the percentile of interest, the differential health service 160 can initiate a corrective action.

In some embodiments that include untrusted status indicators in the form of an error code, the differential health service 160 may apply a scaling factor associated with a particular error code to each termination event prior to calculating various metrics of a population. For example, if a certain error code was highly indicative of a hardware failure (e.g., a disk write error code), that termination event might be weighted by a factor of 3. In the previous example, if there are ten termination events with the one having a negative status indicator a scaling factor of 3 and another having a scaling factor of 0.5, the mean failure rate would be $(3+0.5)/10=0.35$.

As indicated at circle 3, if the differential health service 160 determines that corrective action is needed, the differential health service 160 initiates a corrective action with the capacity management service 405. In one embodiment, the capacity management service 405 vends an API through which the differential health service can initiate a corrective action. One such corrective action is removing a host computer system from the pool of active computer systems 409. For example, the differential health service 160 may determine that the mean failure rate of termination events associated with a particular host computer system (a test population) exceeds the mean failure rate of the other host computer systems in a baseline population. The differential health service 160 can provide an identifier of the host computer system to the capacity management service 405 via the API. Upon receiving the identity of the host computer system from the differential health service 160, the capacity management service 405 can deactivate that host computer system.

The degree to which a metric of the test population differs from a metric of the baseline population can vary. Thus, in some embodiments, the capacity management service 405 may vend an API that permits different types of corrective actions to be taken. Different requests to this API can correspond to different types of corrective action. The differential health service 160 may employ multiple thresholds or determinations and initiate different corrective actions for each different threshold or determination. For example, the capacity management service 405 may maintain a queue that automatically deactivates system for maintenance and reactivates systems with recently completed maintenance (e.g., every 5 days a system is deactivated, wiped, restored, and then reactivated). In addition to permitting deactivation of a host computer system, the capacity management service 405 may permit the advancement of host computer systems in that queue. In other words, advancing a host computer system in the queue so that it would undergo maintenance sooner than previously scheduled. Thus, if the differential health service 160 identifies a first host computer system with a mean failure rate that exceeds the mean failure rate of a baseline population by more than a first threshold number of standard deviations (e.g., 1.5 standard deviations), the differential health service 160 may initiate a corrective action with the capacity management service 405 that entails advancing that first host computer system in the maintenance queue by a default or some specified number of positions or amount of time. Additionally, if the if the differential health service 160 identifies a second host computer system with a mean failure rate that exceeds the mean failure rate of a baseline population by more than a second, higher threshold number of standard deviations (e.g., 2.2 standard deviations), the differential health service 160 may initiate a corrective action with the capacity management service 405 that entails deactivating the second computer system.

In some embodiments, the differential health service 160 will regularly evaluate termination event data from each host computer system (test populations) in the pool of active host computer systems 409 against the termination event data of all of the host computer systems (baseline populations) in the pool of active host computer systems 409 and initiate a corrective action on any identified outliers.

It should be noted that a host computer system need not be the unit of evaluation nor the unit upon which corrective action is taken. Take, for instance, the rollout of an updated guest operating system version. The differential health service 160 can compare metric(s) of a baseline population that includes termination events of all active host computer systems where the terminated virtual machine was running a version of the guest operating system prior to the update against the metric(s) of a test population that includes termination events of all active computer systems where the terminated virtual machine was running the updated version of the guest operation system. If a difference that exceeds a threshold is identified, the differential health service 160 may initiate a corrective action with the capacity management service 405 to prevent the launch of new virtual machines with the updated guest operating system version and rollback to the previous version without deactivating host computer systems from the active pool 409 (assuming, of course, that provisions were made so that the prior version of the guest operating system was still available).

It is further noted that various metrics can be used to compare baseline and test populations. Such metrics include means, counts, percentiles, other statistical characteristics of a population, and so on. While the discussion above used failure rates as an example, a failure rate has a complementary success rate. For example, rather than determining that a failure rate associated with a particular host computer system exceeds the failure rate of a pool of host computer systems by some amount, other embodiments might consider whether the success rate associated with a particular host computer system falls below the success rate of a pool of host computer systems by some amount. In either case, the differential health service is comparing a metric calculated from the baseline population and another metric calculated from the test population to determine whether to take corrective action. For example, the differential health service 160 might determine the $5^{th}$ percentile success rate across the baseline population and determine to take corrective action upon systems exhibiting a success rate at or below that percentile. Conversely, the differential health service 160 might determine the $95^{th}$ percentile failure rate across the baseline population and determine to take corrective action upon systems exhibiting a failure rate at or above that percentile. In either case using percentiles, the percentile itself may be considered the threshold at which to take corrective action-so the difference between metrics can be zero. As yet another example, the differential health service 160 might calculate the mean and standard deviation of a success rate across the baseline population and determine to take corrective action upon systems exhibiting a mean success rate below some threshold number of standard deviations below the mean of the baseline. As yet another example, the differential health service 160 might calculate the mean and standard deviation of a failure rate across the baseline population and determine to take corrective action upon systems exhibiting a mean failure rate above some threshold number of standard deviations above the mean of the baseline.

FIG. 5 is a flow diagram illustrating operations 500 of a method for terminating virtual machines according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by the agent 112 or the agent 212 of the other figures.

The operations 500 include, at block 502, receiving, by an agent that manages one or more virtual machines executed by a host computer system of a provider network, a request to terminate a first virtual machine, wherein the request includes an untrusted status indicator associated with the termination request, the untrusted status indicator originating from an environment executing untrusted software. For example, as described with reference to circle 2 of FIG. 1, the agent 112 can receive a termination request originating from an untrusted environment. As another example, as described with reference to circle 3 of FIG. 2, the agent 212 can receive a termination request originating from an untrusted environment. In either example, the termination request includes an untrusted status indicator. Exemplary status indicators include a flag indicating normal or abnormal (e.g., good/bad) termination and an error code that conveys additional information about the reason for the termination.

The operations 500 further include, at block 504, terminating the virtual machine. As described above, an agent such as the agent 112 or the agent 212 can include functionality to manage the virtual machines executing on a host computer system (e.g., as a hypervisor, as a virtual machine manager, as a lightweight virtual machine manager).

The operations 500 further include, at block 506, sending, by the agent, termination event data to a differential health service of the provider network, the termination event data including an indication of the first host computer system and the untrusted status indicator associated with the termination request. The sending of termination event data as well as exemplary termination event data is described above with reference to circle 3 of FIG. 1 and circle 4 of FIG. 2.

FIG. 6 is a flow diagram illustrating operations 600 of a method for evaluating virtual machine host health based at least in part on untrusted virtual machine status data according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by the differential health service 160 and/or the capacity management service 405 of the other figures.

The operations 600 include, at block 602, updating a first population of termination event data with the first termination event data, wherein each termination event data in the first population of termination event data represents a virtual machine termination event and includes an untrusted status indicator associated with the virtual machine termination event. As described elsewhere herein, a differential health service 160 can aggregate termination event data sent by various agents that manage the virtual machines executing on host computer systems. In addition to having an untrusted status indicator, termination events can have other parameters. Exemplary other parameters include information used to identify a customer of the virtual machine, hardware and/or software configuration data of the virtual machine, and an identifier of the underlying host computer system on which the termination event occurred. Taken together, the termination event data associated with each individual termination event can form a population of termination event data.

The operations 600 further include, at block 604, determining that a first metric associated with the first host computer system differs from a second metric associated with a pool of host computer systems by at least a first amount and based at least in part on the untrusted status indicator, wherein the pool of host computer systems includes the first host computer system. As described above, various metrics can be determined or calculated from various populations of termination events. Exemplary metrics include means, standard deviations, counts of status indicators of different types (e.g., good and bad) or categories (e.g., errors and non-errors), percentiles, and so on. Additionally, the first population of termination event data can be filtered into various sub-populations by selecting one or more parameters of interest. For example, a baseline population might represent all of the current termination event data associated with a pool of host computer systems, while a test population might represent all of the current termination event data associated with a particular host computer system. The differential health service 160 can calculate one metric from the baseline population (e.g., a mean failure rate, a percentile, etc.) and another metric from the test population (e.g., a mean failure rate). The differential health service 160 can then look at the difference between these metrics to determine whether to take a corrective action. The difference may be evaluated in various ways. For example, the difference might be greater (or less) than some amount such as a threshold number of standard deviations (e.g., in the case where the two metrics are statistical characteristics such as the means of the populations) or some other amount (which can even include zero if the comparison checks whether a value exceeds a certain threshold such as a percentile).

The operations 600 further include, at block 606, sending a request to cause a corrective action to be taken on the first host computer system. One such corrective action is deactivating some aspect of a host computer system (whether the system as a whole, some software version, etc.) to avoid future virtual machines from being launched on that system or having a particular configuration. Another corrective action is expediting the scheduled maintenance for a computer system. In some embodiments, the degree to which the various metrics differ can determine whether to take one of multiple corrective actions as described above.

Figure 7:
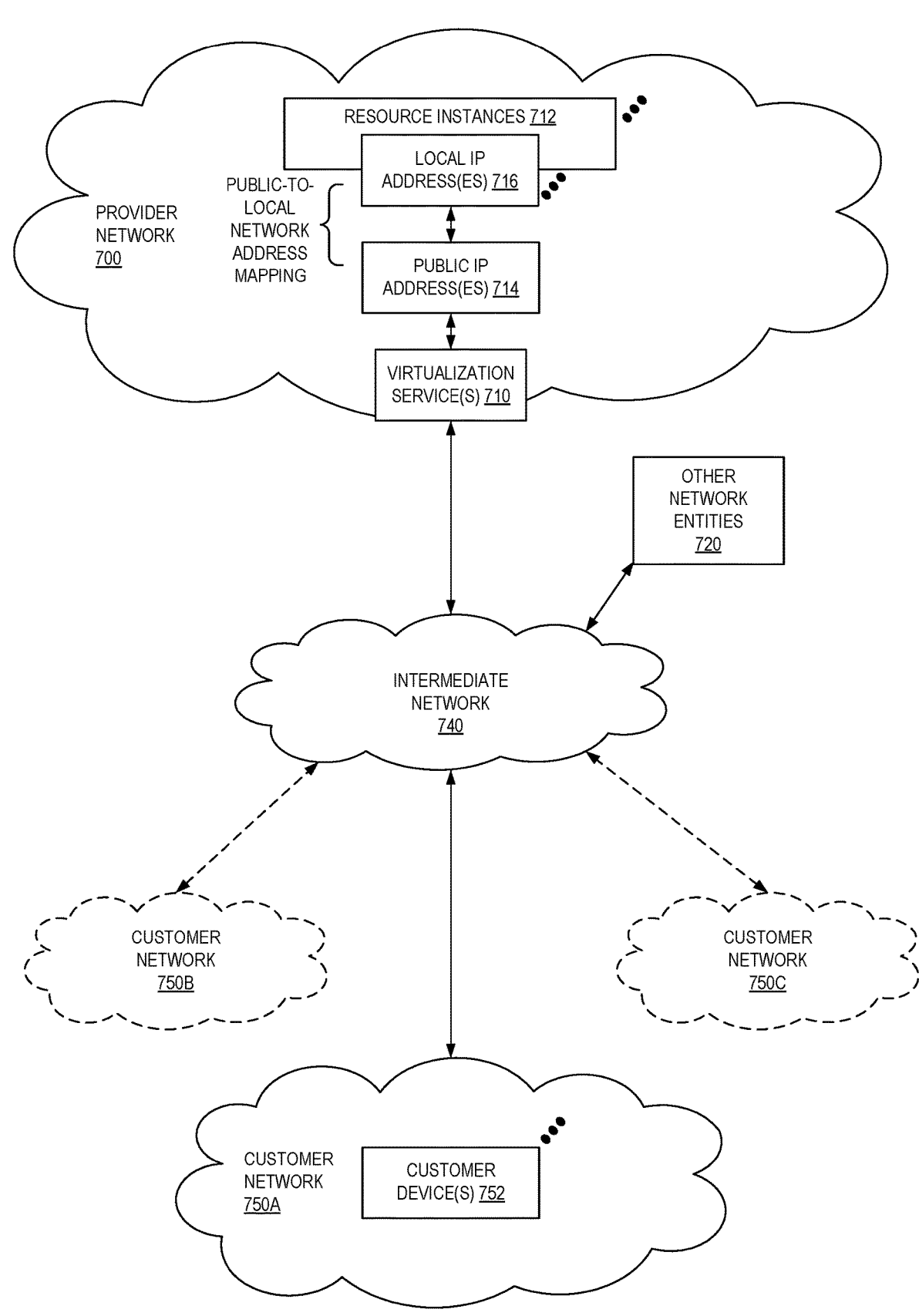
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
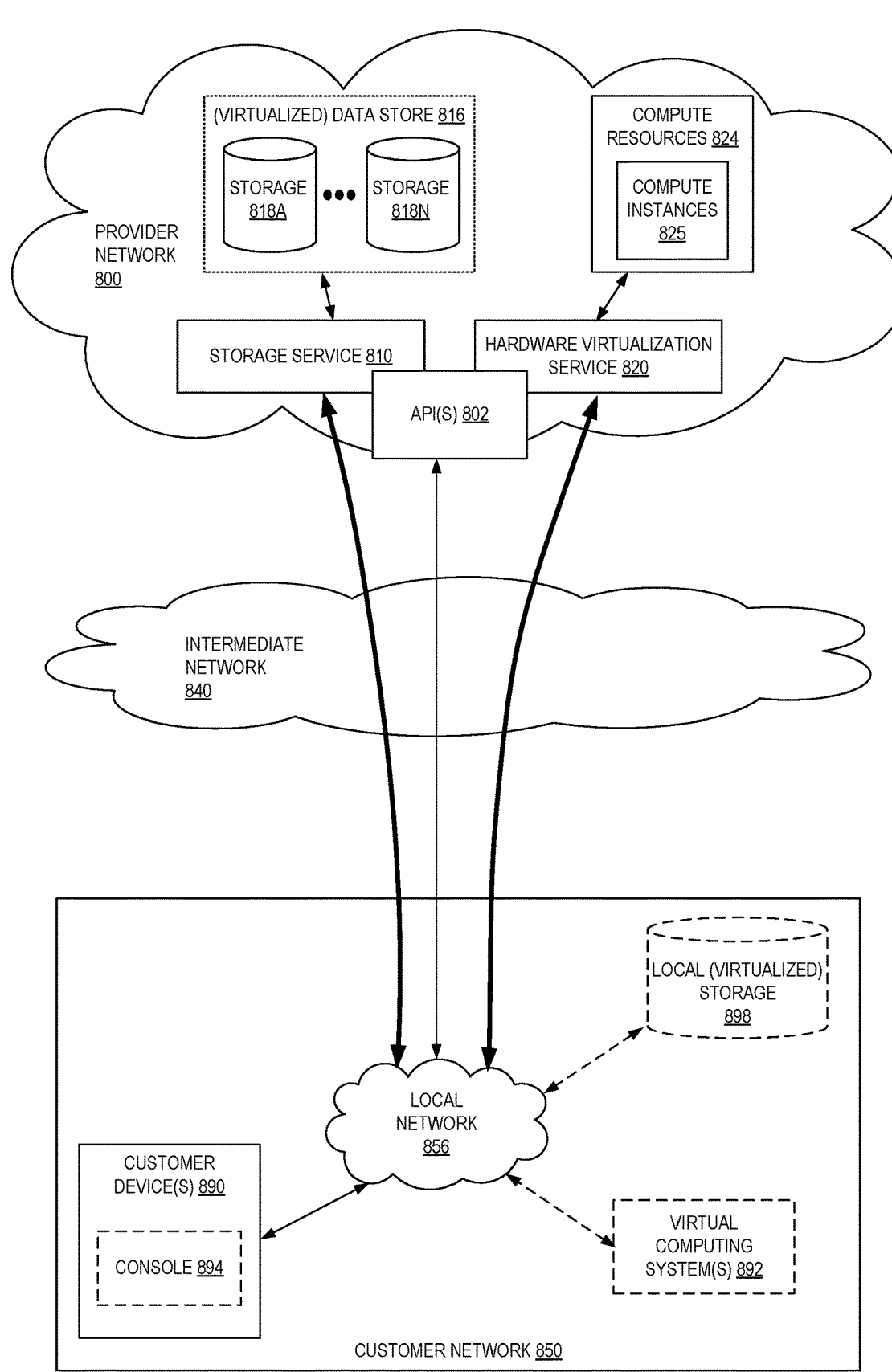
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
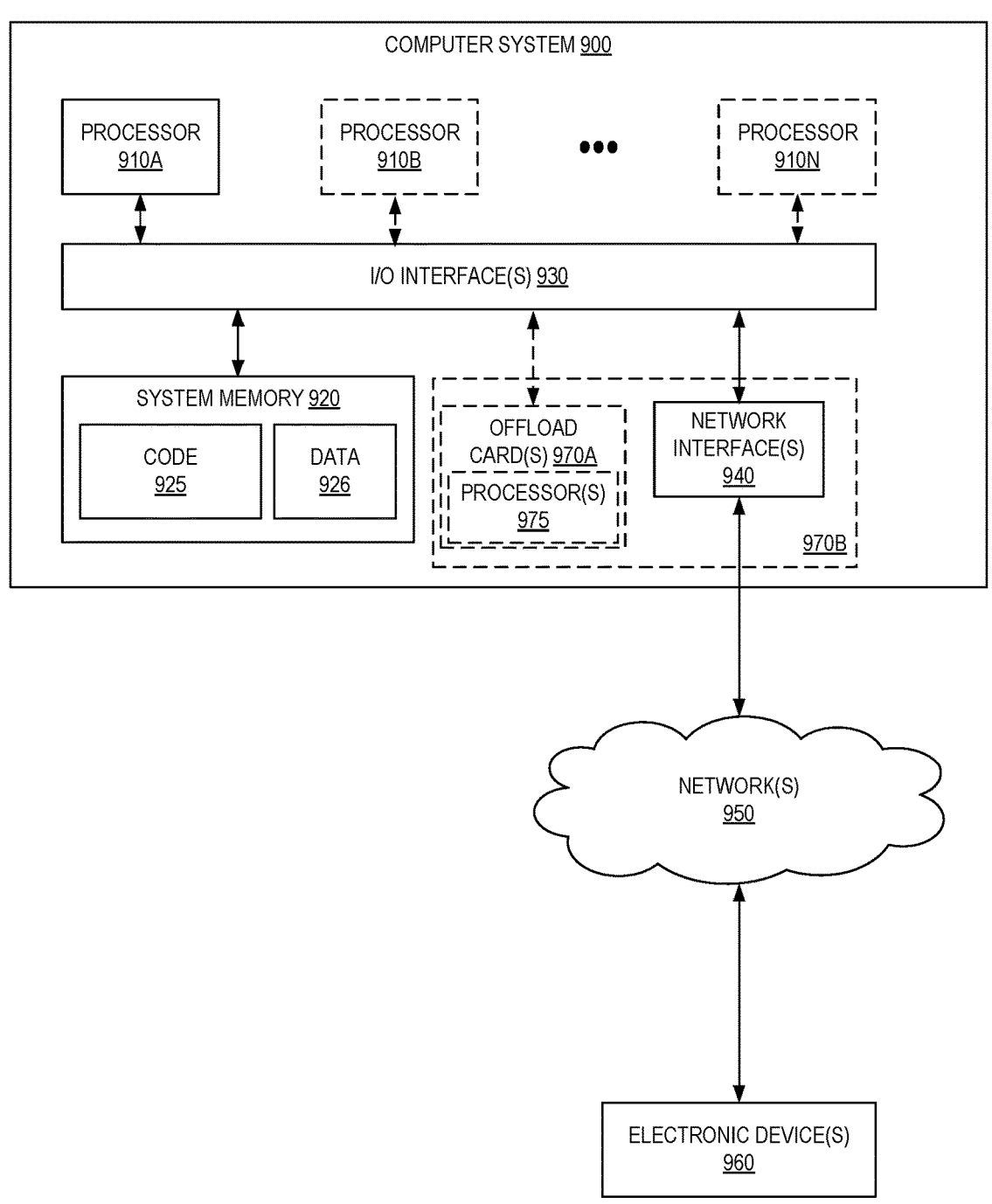
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as code 925 (e.g., executable to implement, in whole or in part, one or more of the agent 112, the agent 212, the agent 154, the differential health service 160, the capacity management service 405) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/ telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/ or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 818A-818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:

receiving, by an agent that manages one or more virtual machines executed by a first host computer system of a provider network, a request to terminate a first virtual machine of the one or more virtual machines, wherein the request originates from an untrusted environment and includes an untrusted status indicator associated with the request to terminate the first virtual machine;

terminating the first virtual machine;

sending, by the agent, first termination event data to a differential health service of the provider network, the first termination event data including an indication of the first host computer system and the untrusted status indicator associated with the request to terminate the first virtual machine; and by the differential health service:

updating a first population of termination event data with the first termination event data, wherein each termination event data in the first population of termination event data represents a virtual machine termination event and includes an untrusted status indicator associated with the virtual machine termination event;

calculating a first mean and a first standard deviation of a failure rate of a baseline population of termination event data selected from the first population of termination event data based at least in part on the untrusted status indicator of the first termination event data;

calculating a second mean of a failure rate of a test population of termination event data selected from the first population of termination event data;

determining that the second mean exceeds the first mean by more than a threshold number of the first standard deviations; and sending a second request to cause the first host computer system to be removed from a pool of active host computer systems.

2. The computer-implemented method of claim 1, wherein the environment executing untrusted software is either (1) the first virtual machine or (2) another virtual machine executing a first node in a distributed computing cluster, wherein the first virtual machine executes a second node in the distributed computing cluster.

3. The computer-implemented method of claim 1, wherein the untrusted status indicator is an error code having an associated weight, and wherein calculating the first mean of the failure rate includes scaling a contribution of the first termination event data to the first mean by the associated weight.

4. A computer-implemented method comprising:

receiving, by an agent that manages one or more virtual machines executed by a first host computer system of a provider network, a request to terminate a first virtual machine of the one or more virtual machines, wherein the request originates from an untrusted environment and includes an untrusted status indicator associated with the request to terminate the first virtual machine;

sending, by the agent, first termination event data to a differential health service of the provider network, the first termination event data including an indication of the first host computer system and the untrusted status indicator associated with the request to terminate the first virtual machine;

determining, by the differential health service, that a first metric associated with the first host computer system differs from a second metric associated with a pool of host computer systems by at least a first amount and based at least in part on the untrusted status indicator, wherein the pool of host computer systems includes the first host computer system; and sending, by the differential health service, a second request to cause a corrective action to be taken on the first host computer system.

5. The computer-implemented method of claim 4, further comprising updating, by the differential health service, a first population of termination event data with the first termination event data, wherein each termination event data in the first population of termination event data represents a virtual machine termination event and includes an untrusted status indicator associated with the virtual machine termination event.

6. The computer-implemented method of claim 5, wherein determining that a first metric associated with the first host computer system differs from a second metric associated with a pool of host computer systems by at least a first amount and based at least in part on the untrusted status indicator comprises:

calculating a first mean and a first standard deviation of a failure rate of a baseline population of termination event data selected from the first population of termination event data, wherein the first mean is the second metric;

calculating a second mean of a failure rate of a test population of termination event data selected from the first population of termination event data, wherein the second mean is the first metric; and determining that the second mean exceeds the first mean by more than a threshold number of first standard deviations, wherein the threshold number of first standard deviations is the first amount.

7. The computer-implemented method of claim 6, wherein the untrusted status indicator is an error code having an associated weight, and wherein calculating the first mean of the failure rate includes scaling a contribution of the first termination event data to the first mean by the associated weight.

8. The computer-implemented method of claim 5, wherein determining that a first metric associated with the first host computer system differs from a second metric associated with a pool of host computer systems by at least a first amount and based at least in part on the untrusted status indicator comprises:

calculating a first mean of a failure rate of a test population of termination event data selected from the first population of termination event data, wherein the first mean is the first metric;

wherein the second metric corresponds to a failure rate percentile of a baseline population of termination event data selected from the first population of termination event data; and determining that the first metric exceeds the second metric, wherein the first amount is zero.

9. The computer-implemented method of claim 4, wherein the second request to cause a corrective action corresponds to a type of corrective action to be taken, and wherein the type of corrective action to be taken is based on an amount of difference between the first metric and the second metric.

10. The computer-implemented method of claim 4, further comprising performing the corrective action, wherein the corrective action comprises either (1) removing the first host computer system from the pool of host computer systems or (2) reducing an amount of time until a next maintenance of the first host computer system.

11. The computer-implemented method of claim 4, wherein the environment executing untrusted software is either (1) the first virtual machine or (2) another virtual machine executing a first node in a distributed computing cluster, wherein the first virtual machine executes a second node in the distributed computing cluster.

12. The computer-implemented method of claim 4, wherein the first termination event data further includes an indication of a customer associated with the first virtual machine, an indication of a hardware configuration of the first virtual machine, and an indication of a software configuration of the first virtual machine.

13. A system comprising:

a first host computer system of a provider network, wherein the first host computer system executes an agent that manages one or more virtual machines executed by the first host computer system, the first host computer system including instructions that upon execution cause the agent to:

receive a request to terminate a first virtual machine of the one or more virtual machines, wherein the request originates from an untrusted environment and includes an untrusted status indicator associated with the request to terminate the first virtual machine;

send first termination event data to a differential health service of the provider network, the first termination event data including an indication of the first host computer system and the untrusted status indicator associated with the request to terminate the first virtual machine;

a first one or more electronic devices to implement the differential health service of the provider network, the differential health service including instructions that upon execution cause the differential health service to:

determine that a first metric associated with the first host computer system differs from a second metric associated with a pool of host computer systems by at least a first amount and based at least in part on the untrusted status indicator, wherein the pool of host computer systems includes the first host computer system; and send a second request to cause a corrective action to be taken on the first host computer system.

14. The system of claim 13, wherein the differential health service includes further instructions that upon execution cause the differential health service to update a first population of termination event data with the first termination event data, wherein each termination event data in the first population of termination event data represents a virtual machine termination event and includes an untrusted status indicator associated with the virtual machine termination event.

15. The system of claim 14, wherein to determine that a first metric associated with the first host computer system differs from a second metric associated with a pool of host computer systems by at least a first amount and based at least in part on the untrusted status indicator, the differential health service includes further instructions that upon execution cause the differential health service to:

calculate a first mean and a first standard deviation of a failure rate of a baseline population of termination event data selected from the first population of termination event data, wherein the first mean is the second metric;

calculate a second mean of a failure rate of a test population of termination event data selected from the first population of termination event data, wherein the second mean is the first metric; and determine that the second mean exceeds the first mean by more than a threshold number of first standard deviations, wherein the threshold number of first standard deviations is the first amount.

16. The system of claim 15, wherein the untrusted status indicator is an error code having an associated weight, and wherein calculating the first mean of the failure rate includes scaling a contribution of the first termination event data to the first mean by the associated weight.

17. The system of claim 14, wherein to determine that a first metric associated with the first host computer system differs from a second metric associated with a pool of host computer systems by at least a first amount and based at least in part on the untrusted status indicator, the differential health service includes further instructions that upon execution cause the differential health service to:

calculate a first mean of a failure rate of a test population of termination event data selected from the first population of termination event data, wherein the first mean is the first metric;

wherein the second metric corresponds to a failure rate percentile of a baseline population of termination event data selected from the first population of termination event data; and determine that the first metric exceeds the second metric, wherein the first amount is zero.

18. The system of claim 13, wherein the second request to cause a corrective action corresponds to a type of corrective action to be taken, and wherein the type of corrective action to be taken is based on an amount of difference between the first metric and the second metric.

19. The system of claim 13, wherein the corrective action comprises either (1) removing the first host computer system from the pool of host computer systems or (2) reducing an amount of time until a next maintenance of the first host computer system.

20. The system of claim 13, wherein the environment executing untrusted software is either (1) the first virtual machine or (2) another virtual machine executing a first node in a distributed computing cluster, wherein the first virtual machine executes a second node in the distributed computing cluster.

\* \* \* \* \*